United States Patent
Fawzi et al.

[11] 3,912,496
[45] Oct. 14, 1975

[54] UREIDOTRIAZOLES AS CYTOKININS AND PLANT ANTISENESCENCE AGENTS

[75] Inventors: Maged M. Fawzi; Bruno Quebedeaux, Jr., both of Wilmington, Del.

[73] Assignee: E. I. Du Pont de Nemours and Company, Wilmington, Del.

[22] Filed: June 27, 1974

[21] Appl. No.: 483,568

Related U.S. Application Data

[60] Division of Ser. No. 293,540, Sept. 29, 1972, Pat. No. 3,836,350, which is a continuation-in-part of Ser. No. 191,061, Oct. 20, 1971, abandoned.

[52] U.S. Cl. .................................................... 71/92
[51] Int. Cl.² ......................................... A01N 9/22
[58] Field of Search ................................ 71/92, 120

[56] References Cited
UNITED STATES PATENTS

| | | | |
|---|---|---|---|
| 2,723,274 | 11/1955 | Kaiser et al. | 71/92 |
| 3,337,600 | 8/1967 | Speziale et al. | 71/120 |
| 3,646,059 | 2/1972 | Brantley | 71/92 |

OTHER PUBLICATIONS

"Symmetrischer Phenyl (1,3,4-triazol) Harnstoff, (1909), Chem. Ber. 42, pp. 2718–2721, (1909).

*Primary Examiner*—Glennon H. Hollrah

[57] ABSTRACT

Phenylureidotriazoles of the formula:

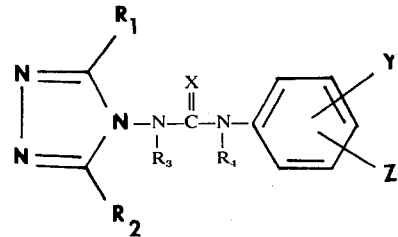

where $R_1$, $R_2$, $R_3$, and $R_4$ are hydrogen or alkyl, X is oxygen or sulfur, Y is hydrogen or fluorine and Z is hydrogen, halogen, nitro group, cyano group, trifluoromethyl, alkyl, alkoxyl or alkylthio group, are effective as antisenescence agents. They are useful for increasing the fruit set and enhancing development of crops such as grapes, wheat, and soybeans and for increasing the life of cut flowers.

Exemplary of the class is the compound 4-(3-phenylureido)-4H-1,2,4-triazole.

3 Claims, No Drawings

UREIDOTRIAZOLES AS CYTOKININS AND PLANT ANTISENESCENCE AGENTS

CROSS-REFERENCE TO RELATED APPLICATION

This is a division of our copending application, Ser. No. 293,540, filed Sept. 29, 1972, now U.S. Pat. No. 3,836,350 which is a continuation-in-part of our application, Ser. No. 191,061, filed Oct. 20, 1971, now abandoned.

BACKGROUND OF THE INVENTION

A compound that at low concentrations will delay the senescence of major agronomic crops is desired by the agricultural industry. Such compounds will increase the yield of the crops. The chemical industry has for many years attempted to find compounds having such utility.

BRIEF SUMMARY OF THE INVENTION

It has now been discovered that compounds of the formula:

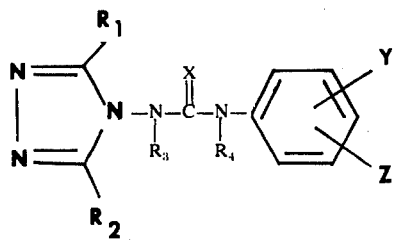

wherein
each of $R_1$ and $R_2$ independently is hydrogen or alkyl of 1 through 6 carbon atoms; provided that the sum of $R_1$ and $R_2$ does not exceed 8 carbon atoms;
each of $R_3$ and $R_4$ independently is hydrogen or alkyl of 1 through 4 carbon atoms;
X is oxygen or sulfur;
Y is hydrogen or fluorine; and
Z is hydrogen, halogen, a nitro group, a cyano group, trifluoromethyl, alkyl of 1 through 4 carbon atoms, $SR_5$, or $OR_5$, where $R_5$ is alkyl of 1 through 4 carbon atoms can be formulated with adjuvants and when applied to plants, will increase fruit set and enhance development of crops, e.g., grapes, wheat, and soybeans.

Aqueous solutions of these compounds are also suitable for preserving a wide variety of cut flowers such as roses, carnations, gladioli, chrysanthemums, and snapdragons.

Preferred, because of the ease of synthesis and higher activity are those compounds where
$R_1$, $R_2$, $R_3$, $R_4$, and Y are hydrogen atoms;
X is oxygen or sulfur; and
Z is hydrogen, fluorine, or alkoxy group of 1 through 4 carbon atoms.

Most preferred is the compound 4-(3-phenylureido)-4H-1,2,4-triazole. This compound is known in the literature; its preparation is described in Chem. Ber. 42, 2718 (1909).

DETAILED DESCRIPTION OF THE INVENTION

The compounds of the above formula where $R_4$ is hydrogen are conveniently prepared by the methods set forth in Chem. Ber. 42, 2718 (1909) when X is oxygen and in the J. Medicinal Chem. 14, 53 (1971) when X is sulfur. Basically, the methods of these references are the same and compounds are obtained in good yields by heating an equimolar mixture of the appropriate 4-amino-4H-1,2,4-triazole and the properly substituted phenyl isocyanate or the phenyl isothiocyanate in a suitable solvent until the reaction is complete. The method of synthesis can be clearly understood by reference to the following reaction where $R_1$, $R_2$, $R_3$, X, Y and Z have the same significance as in the above formula:

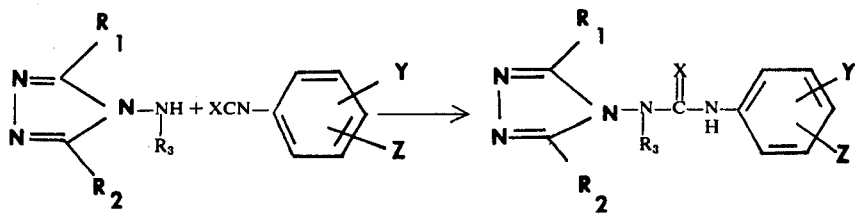

The compounds where $R_3$ and/or $R_4$ are alkyl are conveniently prepared by the action of the appropriate amine on the carbamate, thionocarbamate, or the dithiocarbamate of the substituted 4-amino-4H-1,2,4-triazole.

This preparative method can be more fully understood by reference to the following sequence of reactions where $R_1$, $R_2$, $R_3$, $R_4$, X, Y, and Z are as previously set forth in the formula and $R_5$ is methyl of ethyl:

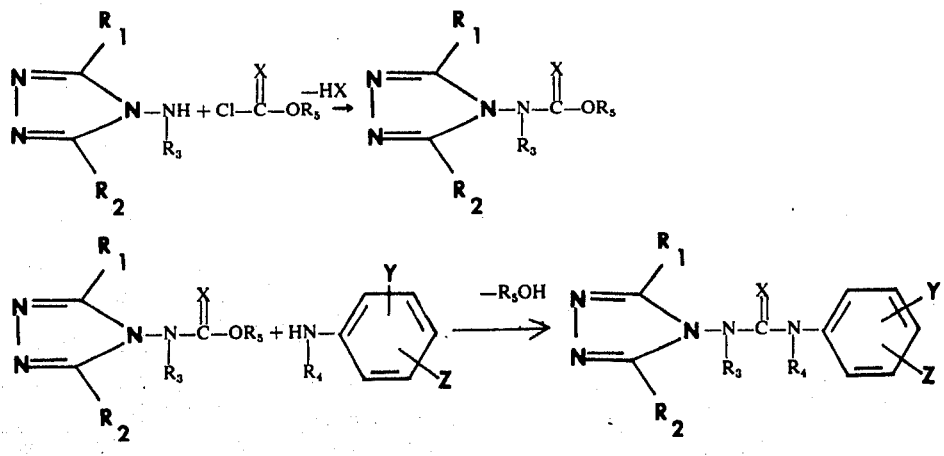

The starting 4-amino-4H-1,2,4-triazoles can be prepared by a variety of literature methods which are outlined below:

The 4-amino-4H-1,2,4-triazole is prepared by the method described in Org. Syn. Coll. Vol. III, 96 (1955). The procedure involves the addition of hydrazine hydrate to ethyl formate followed by the thermal decomposition of the resulting formylhydrazine to give the desired triazole. The method of synthesis is shown below:

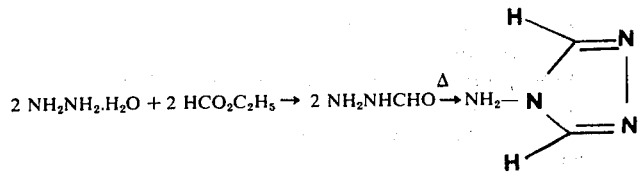

In order to prepare compounds of the formula where $R_1$ and $R_2$ are alkyl, the desired 4-amino-4H-3,5-dialkyl-1,2,4-triazoles can be prepared either from the fatty acid hydrazide or from the 1,2-diacylhydrazide and hydrazine hydrate by the methods described in J. Org. Chem. 18, 872 (1953). These methods are outlined in the following equations:

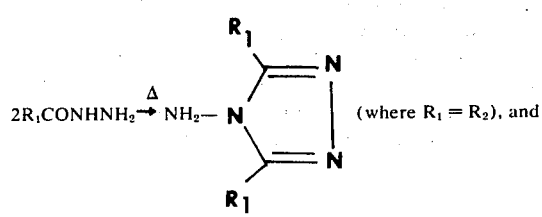

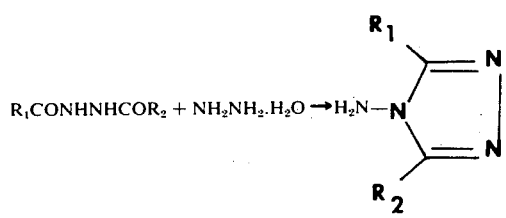

For the synthesis of compounds of the formula where $R_1$ is hydrogen and $R_2$ is alkyl, the 3-alkyl-4-amino-4H-1,2,4-triazoles are prepared by the desulfurization of the appropriate thiol by the procedure described in the J. Medicinal Chem. 14, 335 (1971).

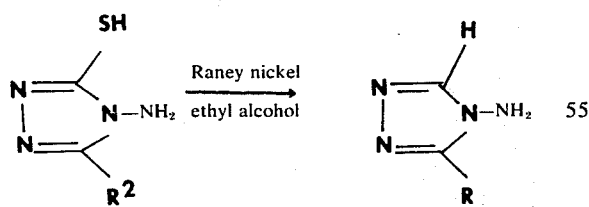

The following examples illustrate the preparation of some of the compounds of the invention.

EXAMPLE 1

Synthesis of 4-(3-Phenylureido)-4H-1,2,4-triazole

Phenyl isocyanate (6 parts) is added to a hot (approx. 50°C) stirred solution of 4-amino-4H-1,2,4-triazole (4.2 parts) in tetrahydrofuran (350 parts). The mixture is refluxed for 1 hour then left overnight at room temperature. Pure 4-(3-phenylureido)-4H-1,2,4-triazole (9.7 parts) is obtained by filtration, m.p. 231°–231.5°C.

Anal. Calcd. for $C_9H_9N_5O$: C, 53.20; H, 4.46; N, 34.46
Found: C, 53.21; H, 4.58; N, 34.44

EXAMPLE 2

Synthesis of 4-(3-Phenyl-2-thioureido)-4H-1,2,4-triazole

Phenyl isothiocyanate (13.5 parts) is added to a solution of 4-amino-4H-1,2,4-triazole (8.4 parts) in ethyl alcohol (30 parts). The mixture is heated on the steam bath for 15 minutes, then the precipitated solid is recrystallized from ethyl alcohol to give (8.1 parts) of 4-(3-phenyl-2-thioureido) -4H-1,2,4-triazole, m.p. 170°–171°C.

Anal. Calcd. for $C_9H_9N_5S$: C, 49.40; H, 4.11; N, 32.0
Found: C, 49.17; H, 4.18; N, 33.06

EXAMPLE 3

Synthesis of 3,5-dimethyl-4-(3-phenylureido)-4H-1,2,4-triazole

Phenyl isocyanate (6 parts) is added to a hot (approx. 50°C) stirred solution of 4-amino-3,5-dimethyl-4H-1,2,4-triazole (5.6 parts) and a few crystals of triethylenediamine in tetrahydrofuran (350 parts). The mixture is refluxed for 4 hours and then left overnight at room temperature. The solvent is removed under vacuum and the crude product is crystallized from acetonitrile to give (10.5 parts) of 3,5-dimethyl-4-(3-phenylureido)-4H-1,2,4-triazole, m.p. 205°–207°C.

Anal. Calcd. for $C_{11}H_{13}N_5O$: C, 57.13; H, 5.88; N, 30.28
Found: C, 57.28; H, 5.64; N, 29.81

EXAMPLE 4

Synthesis of 4-(3Methyl-3-phenylureido)-4H-1,2,4-triazole

A mixture of ethyl 4H-1,2,4-triazole-4-carbamate (5 parts), N-methylaniline (15 parts) and xylene (15 parts) is refluxed for 2 hours in a flask fitted with a Dean-Stark trap. After standing overnight at room temperature the crude product is removed by filtration, washed with ethyl alcohol and recrystallized from acetonitrile to give (1.5 parts) of 4-(3-methyl-3-phenylureido)-4H-1,2,4-triazole, m.p. 266°–268°C.

Anal. Calcd. for $C_{10}H_{11}N_5O$: C, 55.29; H, 5.10; N, 32.24
Found: C, 55.28; H, 5.12; N, 32.19

The compounds of this invention are useful to delay the senescence of major agronomic and horticultural crops such as wheat, rice, corn, soybeans, grapes, apples, peaches, blueberries and leafy vegetables, e.g., cabbage, lettuce and celery, thus increasing the production time and yield.

The compounds are also useful for enhancing the protein content of plants and inducing the plants to produce more flowers and fruiting sites.

The compounds will be applied to the plants during early vegetative growth, flowering or senescent stages depending on the crop.

The compounds of the present invention also prolong the life of cut flowers. This activity is believed to be a manifestation of the antisenescence activity of these compounds.

The rate of application, e.g., the antisenescence amount of growing crops, will be from 0.1 to 1 kg/ha with 0.2 to 0.3 kg as the preferred rate. The exact rate will depend upon the crop, the climate and other environmental factors. A person with ordinary skill in the art will be able to select the proper rate for a particular situation.

For prolonging the life of cut flowers, the compounds of this invention are usually dissolved or dispersed in water at concentrations of about 1–200 ppm. Other active ingredients may also be present in such solutions, for example, bactericides, fungicides, heavy metal complexes, sucrose, plant hormones such as auxins and giberellins, or chelating agents such as 8-hydroxyquinoline. Nevertheless, it has been found that the vase life of cut flowers is shorter in the absence of ureidotriazoles of this invention even if the other ingredients are present.

The active compounds of this invention can be applied to growing crops in a variety of formulations, including wettable powders, suspensions, emulsifiable concentrates, dusts, solutions, granules, pellets, etc. High strength compositions may also be prepared for use by local formulators in further processing.

These formulations include one or more of the active compounds, and can include surface-active agents, solid or liquid diluents and other materials as required to produce the desired formulation.

The surface-active agents act as wetting, dispersing and emulsifying agents which assist dispersion of the active material in a spray, and improve wetting of waxy foliage and the like by the spray. Thus they aid in convenience, accuracy, and effectiveness in use. The surfactants can include such anionic, non-ionic and cationic agents as have been used heretofore in pesticidal compositions of similar type. A detailed list of such agents may be found in "Detergents and Emulsifiers, 1970 Annual", (John W. McCutcheon, Inc.). Anionic and non-ionic surfactants are preferred.

Preferred dispersants in powder formulations and suspensions are alkali and alkaline earth salts of lignosulfonic acids, salts of polymerized alkylarylsulfonates which are sold under the "Daxad" and "Darvan" trademarks, as well as methylcellulose, polyvinyl alcohol and the like.

Surfactants are present in compositions of this invention in amounts up to about 20% by weight based on the total weight of the resulting composition.

Powder and dust preparations can be made by blending the active ingredient, with or without surfactant, with finely divided solids such as talcs, natural clays, pyrophyllite, diatomaceous earth; flours such as walnut shell, wheat, redwood, soya bean and cotton seed; or inorganic substances such as magnesium carbonate, calcium carbonate, calcium phosphate, sodium silicoaluminate, synthetic silicas, sulfur and lime.

Preferred wettable powder formulations will contain 40% or more active ingredient together with sufficient surfactant and inert diluent to permit dispersion in water for spray application. Compositions intended for dust application will generally contain less than 50% active ingredient.

Powdered compositions can be converted in granules by adding a liquid, treating mechanically, and usually, drying. Water-soluble binders, such as inorganic salts, urea, lignin-sulfonate, methyl cellulose, and the like, can be included in these particulate formulations in amounts up to about 25% by weight of the finished granule or pellet. Alternatively, a melt, solution or suspension of the active ingredient can be sprayed on the surface of preformed granules of clay, vermiculite, corn cob and the like. Surfactants may also be included in formulations of the latter type.

Suspension formulations can be made in water, or in organic liquids, or in mixtures of water and water-miscible organic liquids in which the active ingredient has a solubility of less than about 0.1%. The preparations usually include, in addition to the active ingredient and liquid carrier, surfactants, viscosity control agents, anti-microbial agents and other modifiers.

Solution formulations can be prepared in organic solvents. Solution formulations can be used for direct low-volume applications. For such use, all that is required is practical solubility and stability of the active material in the chosen solvent. An important sub-class of solution or suspension formulations is emulsifiable concentrates. In these, a water-immiscible solvent is required as well as a surfactant system to help form and stabilize the aqueous emulsion which the ultimate user will prepare for application.

All compositions intended for spray use can contain minor amounts of additives to reduce foam, inhibit corrosion, prevent claying, reduce caking, etc. as the conditions of use may dictate. The conditions of need for and use of such additives are generally known in the art.

The compositions may also include film forming polymers, humectants, oils and the like which act as spreaders, stickers or penetration aids. Examples of such additives are polyethylene glycols, alkyd resin derivatives, acrylic emulsions, protein colloids, glycerol and the like. In many cases it is preferable to tank-mix these additives.

Other plant growth regulants as well as pesticides may be included in the compositions discussed above for convenience in use. For flexibility in relative rate of use under differing conditions, tank-mixes are frequently preferred.

The following examples illustrate formulations and the utility of compounds of the invention. All percentages and parts are by weight unless otherwise indicated.

EXAMPLE 5

| | Percent |
|---|---|
| 4-(3-phenylureido)-4H-1,2,4-triazole | 50 |
| Sodium alkylnaphthalenesulfonate | 3 |
| Sodium ligninsulfonate | 3 |
| Kaolinite | 44 |

The ingredients are blended, passed through a hammer mill and then an air mill to produce particles substantially all below 20 microns. The product is reblended before packaging.

The following compounds can be formulated in like manner and used to increase the fruit set and enhance development of crops:

4-[3-(3-trifluoromethylphenyl)ureido]-4H-1,2,4-triazole
4-[3-(4-cyanophenyl)ureido]-4H-1,2,4-triazole
4-[3-(3-chlorophenyl)ureido]-4H-1,2,4-triazole
4-[3-(3-nitrophenyl)ureido]-4H-1,2,4-triazole
4-[3-(4-methoxyphenyl)ureido]-4H-1,2,4-triazole
4-[3-(4-iodophenyl)ureido]-4H-1,2,4-triazole
4-[3-(2-methylthiophenyl)ureido]-4H-1,2,4-triazole
4-[3-(2-butoxyphenyl)ureido]-4H-1,2,4,-triazole
4-[3-(2-butylthiophenyl)ureido]-4H-1,2,4-triazole
4-[3-(4-isopropylphenyl)ureido]-4H-1,2,4-triazole
4-[3-(4-chloro-3-fluorophenyl)ureido]-4H-1,2,4-triazole
4-[3-(4-fluoro-3-nitrophenyl)ureido]-4H-1,2,4-triazole
4-[3-(2-fluoro-4-methylphenyl)ureido]-4H-1,2,4-triazole
4-[3-(2-fluorophenyl)-1-methylureido]-4H-1,2,4-triazole
4-[1-butyl-3-(2-fluorophenyl)ureido]-4H-1,2,4-triazole
4-(1-isopropyl-3-phenylureido)-4H-1,2,4-triazole
4-[3-isopropyl)-3-(2-methoxyphenyl)ureido]-4H-1,2,4-triazole
4-[3-(2-fluorophenyl)-3-methylureido]-4H-1,2,4-triazole
4-(3-butyl-3-phenylureido)-4H-1,2,4-triazole
3-ethyl-5-hexyl-4-(3-phenylureido)-4H-1,2,4-triazole
3,5-dimethyl-4-[3-(2-fluorophenyl)ureido]-4H-1,2,4-triazole
3,5-diethyl-4-[3-(2-fluorophenyl)ureido]-4H-1,2,4,-triazole
3,5-diisopropyl-4-[3-(3-trifluoromethylphenyl)ureido]-4H-1,2,4-triazole
3,5-di-tert-butyl-4-[3-(4-chlorophenyl)ureido]-4H-1,2,4-triazole
3,5-di-sec-butyl-4-[3-(4-isopropylphenyl)ureido]-4H-1,2,4-triazole
3,5-di-n-butyl-4-[3-(2-nitrophenyl)ureido]-4H-1,2,4-triazole
3-octyl-4-[3-(2-methoxyphenyl)ureido]-4H-1,2,4-triazole
3-hexyl-4-(3-phenylureido)-4H-1,2,4-triazole
3-isobutyl-4-[3-(2-fluorophenyl)ureido]-4H-1,2,4-triazole
4-[3-(2-methoxyphenyl)ureido]-3-methyl-4H-1,2,4-triazole
3,5-dimethyl-4-(3-phenyl-2-thioureido)-4H-1,2,4-triazole
3-butyl-4-[3-(2-fluorophenyl)-2-thioureido]-4H-1,2,4-triazole
3,5-dimethyl-4-(1-methyl-3-phenyl-2-thioureido)-4H-1,2,4-triazole
4-[3-butyl-3-(2-fluorophenyl)-2-thioureido]-4H-1,2,4-triazole
4-(1,3-dimethyl-3-phenylureido)-4H-1,2,4-triazole

EXAMPLE 6

4-(3-phenylureido)-4H-1,2,4-triazole, m.p. 231–231.5, formulated as a wettable powder as described in Example 5 is suspended in water at concentrations between 200 and 2000 ppm with 0.25% (w/w) "Tween 20" (polyoxyethylene sorbitan monolaurate) wetting agent added. Three applications of this material spaced 4 days apart are made to Fredonia grape vines beginning at early anthesis. This treatment results in larger berries, more berries per bunch and more bunches per vine. When harvested in the fall the treated vines yield more grapes than similar untreated ones.

EXAMPLE 7

Wettable Powder

| | Percent |
|---|---|
| 4-[3-(2-fluorophenyl)ureido]-4H-1,2,4-triazole, m.p. 196–197°C | 80 |
| dioctyl sodium sulfosuccinate | 1.5 |
| sodium ligninsulfonate | 3 |
| low-viscosity methyl cellulose | 1.5 |
| attapulgite | 14 |

The ingredients are thoroughly blended, passed through an air mill, to produce an average particle size under 15 microns, reblended, and sifted through a U.S.S. No. 50 sieve (0.3 mm opening) before packaging.

This powder can be used to make a water suspension containing 300 ppm of 4-[3-(2-fluorophenyl)ureido]-4H-1,2,4-triazole with 0.5% of Triton B-1956 (modified phthalic glycerol alkyd resin). The suspension can be applied to developing grape floral clusters by dipping or spraying. This treatment is applied at anthesis and repeated four days later. This treatment results in larger berries, more berries per bunch and more bunches per vine. Thus, more grapes are harvested in the fall from the treated vines than from similar untreated ones.

EXAMPLE 8

A 300 ppm suspension of 4-(3-phenyl-2-thioureido)-4H-1,2,4-triazole, m.p. 170–171, 0.5% "Tween 20" wetting agent and 40 ppm gibberellic acid in water is prepared. A solution of 40 ppm gibberellic acid and wetting agent is also prepared. The treating solutions are applied to developing grape clusters at anthesis and again one week later. The combination of 4-(3-phenylureido)-4H,1,2,4-triazole and gibberellic acid provides a greater increase in yield than either compound applied alone.

EXAMPLE 9

Aqueous Suspension

| | Percent |
|---|---|
| 4-[3-(4-bromophenyl)ureido]-4H-1,2,4-triazole, m.p. 255–260°C | 25 |
| hydrated attapulgite | 3 |
| crude calcium/magnesium ligninsulfonate | 10 |
| sodium dihydrogen phosphate | 0.5 |
| water | 61.5 |

The ingredients are ground together in a ball or roller mill until the solid particles have been reduced to diameters under 10 microns.

The above suspension can be used to prepare a 300 ppm water suspension of 4-[3-(4-bromophenyl)ureido]-4H-1,2,4-triazole with 0.5% "Tween 20" wetting agent and 10 ppm naphthaleneacetic acid. Control solutions containing each of the above compounds alone are also prepared. The treating solutions are applied to developing Fredonia grape clusters by spraying at anthesis and again one week later. The combination of 4-(3-phenylureido)-4H-1,2,4-triazole, and naphthaleneacetic acid produces a greater increase in yield in the fall than does the application of either compound alone.

EXAMPLE 10

Oil Suspension

| | Percent |
|---|---|
| 4-[3-(2-methoxyphenyl)ureido]-4H-1,2,4-triazole, m.p. 188°–190° | 25 |
| polyoxyethylene sorbitol hexaoleate | 5 |
| highly aliphatic hydrocarbon oil | 70 |

The ingredients are ground together in a sand mill until the solid particles have been reduced to under about 5 microns. The resulting thick suspension may be applied directly, but preferably after being extended with oils or emulsified in water.

EXAMPLE 11

A water suspension of 500 ppm 4-(3-phenylureido)-4H-1,2,4-triazole, m.p. 231°–231.5°C, and 0.5% "Tween 20" wetting agent is applied to Elberta peaches at anthesis and again four days later. This treatment results in larger fruit at harvest.

EXAMPLE 12

A suspension of 4-[3-(2-nitrophenyl)ureido]-4H-1,2,4-triazole, m.p. 225°–227°C, and 0.25% "Tween 20" is applied to blueberries by foliar spray to runoff at anthesis. A second application is made one week later. The treatment results in improved yields by increasing the berry set and the berry size.

EXAMPLE 13

A suspension of 500 ppm 4-[3-(3-trifluoromethylphenyl) ureido]-4H-1,2,4-triazole, m.p. 228°–231°C, and 0.1% "Tween 20" wetting agent in water is applied to soybeans by foliar spray at time when the third trifoliate leaf is expanding. A second application is made at anthesis and a third application is made one week later. The treatment causes an increase in the pod set and an increase in the size of the beans. Therefore an increase in yield at harvest is obtained.

EXAMPLE 14

A suspension containing 500 ppm of 4-[3-(4-fluorophenyl) ureido]-4H-1,2,4-triazole, m.p. 241°–244°C, and 0.25% "Tween 20" wetting agent is prepared and applied to a hectare of wheat by foliar spray at anthesis. This treatment is repeated one week later. This treatment causes an increase in seed set and a retention of chlorophyll. As a result photosynthesis continues for a longer period and more photosynthates are stored in the seed. An increase in yield over untreated wheat is obtained.

EXAMPLE 15

A suspension of 300 ppm 3,5-dimethyl-4-(3-phenylureido) -4H-1,2,4-triazole, m.p. 205°–207°C and 0.25% "Tween 20" wetting agent is prepared and sprayed on an acre silage corn at full tassel and again one week later. These treatments increase seed set and prolong the photosynthetic activity, thereby increasing the seed size. A higher yield of dry weight results.

EXAMPLE 16

A suspension containing 500 ppm 3-ethyl-4-(3-phenylureido) -4H-1,2,4-triazole, m.p. 197°–200°C and 0.25% "Tween 20" wetting agent is prepared and sprayed over an acre of paddy rice by helicopter. One application is made at anthesis and another is made four weeks later. This treatment increases seed set and delays senescence in the rice, resulting in an increase in grain yield over the untreated portion of the field.

EXAMPLE 17

These compounds can also be used to delay senescence in leafy vegetables such as cabbage, lettuce, and celery. When 4-(3-phenylureido)-4H-1,2,4-triazole, m.p. 231°–231.5°C is used for this purpose, a suspension of 300 ppm of the active ingredient and 0.25% "Tween 20" is prepared. This suspension is applied as a foliar spray up to 48 hours before harvest or a dip at harvest or up to 48 hours later. This treatment delays chlorophyll and protein deterioration thus improving the nutritional and aesthetic qualities over untreated vegetables.

EXAMPLE 18

Solution

| | Percent |
|---|---|
| 4-(3-phenyl-2-thioureido)-4H-1,2,4-triazole | 20 |
| dimethylformamide | 80 |

The ingredients are combined and stirred with warming to produce a solution. This can be used for direct low volume applications.

EXAMPLE 19

High Strength Concentrate and Dust

| | Percent |
|---|---|
| 4-(3-phenylureido)-4H-1,2,4-triazole | 98.5 |
| silica aerogel | 0.5 |
| synthetic amorphous fine silica | 1.0 |

The ingredients are blended and ground in a hammer mill to produce a high strength concentrate essentially all passing U.S.S. No. 50 mesh. This material can then be shipped or formulated in a number of ways. For example, the following 25% dust can be prepared.

| | Percent |
|---|---|
| high-strength concentrate | 25.4 |
| pyrophyllite | 74.6 |

The materials are thoroughly blended and packaged for use.

EXAMPLE 20

A suspension containing 8000 ppm of 4-(3-phenylureido)-4H-1,2,4-triazole and 0.5% trimethylnonyl polyethylene glycol ether is sprayed to run-off on apple trees in June. The growth of axillary buds is stimulated. This results in the development of more fruiting spurs and a greater set of fruit the next season.

A similar treatment can be used on woody ornamentals to stimulate branching and reduce the number of prunings necessary to produce desirable plants.

EXAMPLE 21

The compounds of this invention provide a means for prolonging the vase life of cut flowers. When carnations variety, "Ohio White Sim", are cut in the tight bud stage and placed in glass jars containing 250 ml of a solution of 4-(3-phenylureido)-4H-1,2,4-triazole, the decorative life of the flower is increased. The table below shows a summary of the results obtained when this compound is tested in comparison to an untreated water control.

| Treatment | Vase life Days |
|---|---|
| H₂O Control | 9 |
| 1 ppm 4-(3-phenylureido)-4H-1,2,4-triazole | 17 |
| 10 ppm 4-(3-phenylureido)-4H-1,2,4-triazole | 20 |

EXAMPLE 22

Cut roses are preserved by merely standing the cut stem of the flower in an aqueous solution of 4-(3-phenylureido)-4H-1,2,4-triazole. When cut roses variety, "Pink Junior Miss", are cut in the tight bud stage and place in glass jars containing 250 ml of a solution of the above compound in concentrations ranging from 10 to 100 ppm, the decorative life of the flower is increased. The table below shows a summary of the results obtained when this compound is tested in comparison to an untreated water control.

| Treatment | Vase life Days |
|---|---|
| H₂O Control | 9 |
| 10 ppm 4-(3-phenylureido)-4H-1,2,4-triazole | 13 |
| 50 ppm 4-(3-phenylureido)-4H-1,2,4-triazole | 15 |
| 100 ppm 4-(3-phenylureido)-4H-1,2,4-triazole | 13 |

We claim:

1. A method for increasing fruit set comprising applying to the crop in antisenescence amount of a compound of the formula:

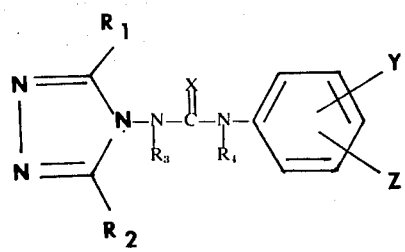

wherein
each of $R_1$ and $R_2$ independently is hydrogen or alkyl of 1 through 6 carbon atoms; provided that the sum of $R_1$ and $R_2$ does not exceed 8 carbon atoms;
each of $R_3$ and $R_4$ independently is hydrogen or alkyl of 1 through 4 carbon atoms;
X is oxygen or sulfur;
Y is hydrogen or fluorine; and
Z is hydrogen, halogen, a nitro group, a cyano group, trifluoromethyl, alkyl of 1 through 4 carbon atoms, $SR_5$, or $OR_5$, where $R_5$ is alkyl of 1 through 4 carbon atoms.

2. The method of claim 1 wherein each of $R_1$, $R_2$, $R_3$, $R_4$ and Y is hydrogen; and Z is hydrogen, fluorine or alkoxyl of 1 through 4 carbon atoms.

3. The method of claim 2 wherein the compound is 4-(3-phenylureido)-4H-1,2,4-triazole.

* * * * *